US00RE34648E

United States Patent [19]

Blond

[11] E Patent Number: Re. 34,648

[45] Reissued Date of Patent: Jun. 28, 1994

[54] CLUTCH PLATE HAVING TWO STAGE TORSION DAMPING MEANS

[75] Inventor: Marcel Blond, Birmingham, Mich.

[73] Assignee: Valeo, Paris, France

[21] Appl. No.: 988,019

[22] Filed: Dec. 10, 1992

Related U.S. Patent Documents

Reissue of:

[64] Patent No.: 4,603,767
Issued: Aug. 5, 1986
Appl. No.: 649,289
Filed: Sep. 11, 1984

U.S. Applications:

[63] Continuation of Ser. No. 163,872, Mar. 3, 1988, abandoned.

[51] Int. Cl.[5] ..... F16D 3/44

[52] U.S. Cl. ..... 192/106.2

[58] Field of Search ..... 192/106.2, 106.1, 70.17, 192/70.18; 464/66, 67, 68

[56] References Cited

U.S. PATENT DOCUMENTS

| | | | |
|---|---|---|---|
| 3,414,101 | 12/1968 | Binder et al. | 192/106.2 |
| 4,024,938 | 5/1977 | Maucher | 192/106.2 |
| 4,212,380 | 7/1980 | Billet | 192/106.2 |
| 4,301,907 | 11/1981 | Carpenter | 192/106.2 |
| 4,433,770 | 2/1984 | Loizeau et al. | 192/106.2 |
| 4,433,771 | 2/1984 | Caray | 192/106.2 |
| 4,440,283 | 4/1984 | Nioloux | 192/106.2 |
| 4,475,640 | 10/1984 | Takeuchi et al. | 192/70.17 |
| 4,485,908 | 12/1984 | Gatewood | 192/106.2 |
| 4,493,408 | 1/1985 | Nagano | 192/106.2 |
| 4,496,036 | 1/1985 | Loizeau | 192/106.2 |
| 4,526,260 | 7/1985 | Schierling | 192/106.2 |
| 4,533,031 | 8/1985 | Nagano | 192/106.2 |
| 4,548,310 | 10/1985 | Maucher | 192/106.2 |
| 4,562,913 | 1/1986 | Cacisotta et al. | 192/106.2 |
| 4,563,165 | 1/1986 | Takeushi | 464/64 |
| 4,576,267 | 3/1986 | Loizeau | 192/70.17 |
| 4,586,595 | 5/1986 | Hartig et al. | 192/106.2 |
| 4,700,822 | 10/1987 | Maucher et al. | 192/106.2 |

FOREIGN PATENT DOCUMENTS

| | | |
|---|---|---|
| 0047583 | 3/1982 | European Pat. Off. . |
| 1518026 | 3/1968 | France . |
| 1525291 | 5/1968 | France . |
| 2503295 | 10/1982 | France . |
| 1167749 | 10/1969 | United Kingdom . |
| 1200013 | 7/1970 | United Kingdom . |
| 1212161 | 11/1970 | United Kingdom . |
| 1251468 | 10/1971 | United Kingdom . |
| 1385304 | 2/1975 | United Kingdom . |
| 2093564 | 9/1982 | United Kingdom . |
| 2040398 | 8/1983 | United Kingdom . |
| 2131914 | 6/1984 | United Kingdom . |

*Primary Examiner*—Rodney H. Bonck
*Attorney, Agent, or Firm*—Longacre & White

[57] ABSTRACT

A clutch plate for a friction clutch is disclosed having first and second torsion dampers coupling a hub to a friction disc. Each of the dampers includes a radial flange, two guide washers fixed to each other on axially opposite slides of the flange, and springs circumferentially interposed between each flange and its guide washers. The friction disc is fixed to one of the second stage guide washers and the first stage guide washers are fixed to the second stage damper. The second stage damper comprises a unit pre-assembled with the hub and is disposed within the confines of the second stage damper, and preferably between one of the guide washers and the flange of the second stage damper.

13 Claims, 4 Drawing Sheets

CLUTCH PLATE HAVING TWO STAGE TORSION DAMPING MEANS

Matter enclosed in heavy brackets [ ] appears in the original patent but forms no part of this reissue specification; matter printed in italics indicates the additions made by reissue.

*This is a continuation of application Ser. No. 07/163,872, filed Mar 3, 1988, which was abandoned upon the filing hereof and which is a reissue of application Ser. No. 06/649,289, filed Sep. 11, 1984 and now U.S. Pat. No. 4,603,767.*

BACKGROUND OF THE INVENTION

The present invention pertains to a clutch plate for a friction clutch.

The invention relates more particularly to such a clutch plate comprising a friction disc and a hub mounted for relative angular displacement within a predetermined range. The friction disc and the hub are coupled together by first and second stage torsion damping means. The first stage torsion damping means being lower rated or lighter than the second stage torsion damping means. Each stage torsion damping means has a radial flange, two guide washers on axially opposite sides of the associated flange and resilient means circumferentially interposed between the flange and the associated guide washers. The first stage damping means is operative between the hub and the second stage damping means and the friction disc is fixed to one of the guide washers of the second stage damping means.

The second stage damping means which is higher rated or stiffer and which may have more than one stage including springs of different spring stiffenesses has the main damping function during normal operation when the torque transmitted in either direction by the clutch plate has a substantial value. The second stage damping means has a filtering function in the transmission of torque particularly when it equips a motor vehicle.

The second stage damping means, despite its efficacy in normal operating conditions, is found to be insufficient to efficiently absorb vibrations when the torque transmitted by the friction disc is very low or nil, such as found when a motor vehicle idles; in this mode of operation the second stage damping means is incapable of preventing the noises known as dead point or idling noises from developing. That is the reason why the first stage damping means operates as a pre-damper specially adapted for damping vibrations and noises in particular operating conditions in which the torque transmitted is very low, notably when the vehicle is idling.

The present invention relates more particularly to a clutch plate in which the friction disc of the first stage damping means is fixed for rotation with the hub and the first stage guide washers are fastened to the second stage damping means.

It will be readily understood that the simultaneous presence of two torsion damping means poses a problem of bulkiness which heretofore has not been resolved in a very satisfactory manner. In particular in known clutch plate designs the two torsion damping means are interleaved and various components are mutually interengaged which results in a complicated assembly and lowers the mechanical strength of the entire clutch plate.

OBJECT AND SUMMARY OF THE INVENTION

An object of the present invention is to provide a clutch plate for a friction clutch of the foregoing type which is devoid of the above mentioned drawbacks, which is easy to assembly despite provision of first and second torsion damping means and has good mechanical strength and is of compact construction.

According to the invention there is provided a clutch plate of the foregoing type wherein the improvement comprises the first stage damping means comprising a pre-assembled unit within the confines of second stage damping means.

Owing to this arrangement although the first and second stage damping means are mutually interengaged to make the clutch plate as compact as possible, the components of the first and second stage damping means are not dispersed. On assembly the first stage damping means is simply received in the second stage damping means as a unit, thereby facilitating assembling the clutch plate.

According to another feature the first stage damping means is accommodated as a unit between the flange and one of the second stage guide washers. Owing to the arrangement the second stage flange and the guide washers are not structurally weakened by the presence of the first stage damping means and is thus intact, with good mechanical strength.

In an embodiment, for fastening the first stage guide washers to the second stage damping means, one of the first stage guide washers comprises bifurcations which are in engagement with resilient means of the second stage damping means.

Alternatively, for fastening the first stage guide washers to the second stage damping means, one of the first stage guide washers comprises protrusions engaged in indentations in the second stage flange. Such a construction clears the first stage damping means with respect to the resilient means of the second stage damping means.

It will be appreciated that the first stage resilient means is compressed during the operation of the first stage damping means and remains compressed during the operation of the second stage damping means. This advantageous mode of operation is obtained in a convenient manner by means of the clutch plate construction of the present invention.

Preferably, the first stage guide washers are fixed to each other by means of rivets and may either be spaced from each other or in contact with each other at the zones where they are riveted together.

Preferred embodiments of the present invention are described below by way of example with reference to the accompanying drawings.

DESCRIPTION OF THE PREFERRED EMBODIMENTS

Reference will first be made to FIGS. 1–4 relative to a first embodiment of the invention as applied to a clutch plate for a truck or bus friction clutch.

The clutch plate comprises a friction disc 10 comprises a plurality of segments for carrying friction facings 11 and a hub 12. The friction facings 11 of the friction disc 10 are adapted to be clamped between two plates of the clutch fixed for rotation with the driving shaft of the associated vehicle and the hub 12 is adapted to be mounted on the main transmission input shaft.

The friction disc 10 and the hub 12 are mounted for relative angular displacement within a predetermined range and coupled to each other by first and second stage torsion damping means A and B.

The first stage torsion damping means A is lower rated than the second stage torsion damping means B and is adapted to absorb vibrations under particular operating conditions in which the torque transmitted by the clutch plate is very low or nil, for example, when the motor vehicle in which it is installed is idling. The second stage damping means B is higher rated and is adapted to operate in normal operating conditions in which the torque transmitted is substantial.

The first stage damping means A (see FIGS. 3 and 4) comprises a radial flange 13A, two guide washers 14A fixed to each other and disposed on axially opposite sides of the radial flange 13A, and resilient means 15A circumferentially interposed between the flange 13A and the guide washers 14A. The guide washers 14A are fixed together and held at a predetermined axial distance from each other by rivets 16A. The resilient means 15A comprises a circular array of one or more sets of springs (a single set of springs being illustrated in the embodiment of FIGS. 3 and 4) mounted in windows 17A in the flange 13A and between the stamped portions 18A of the guide washers 14A.

Similarly, the second stage damping means B comprises a radial flange 13B, preferably of L-shaped cross-section as illustrated, two guide washers 14B, 14'B fixed to each other and disposed on axially opposite sides of the radial flange 13B, and resilient means 15B interposed circumferentially between the flange 13B and the guide washers 14B, 14'B.

The guide washers 14B, 14'B are fixed together and held at a predetermined distance from each other by rivets 16B. The resilient means 15B comprises one or more circular arrays of one or more sets of springs (a single array with two sets of springs being illustrated in FIG. 1) mounted in windows 17B of the flange 13B and between the stamped portions 18B of the guide washers 14B, 14'B.

Figure 1:
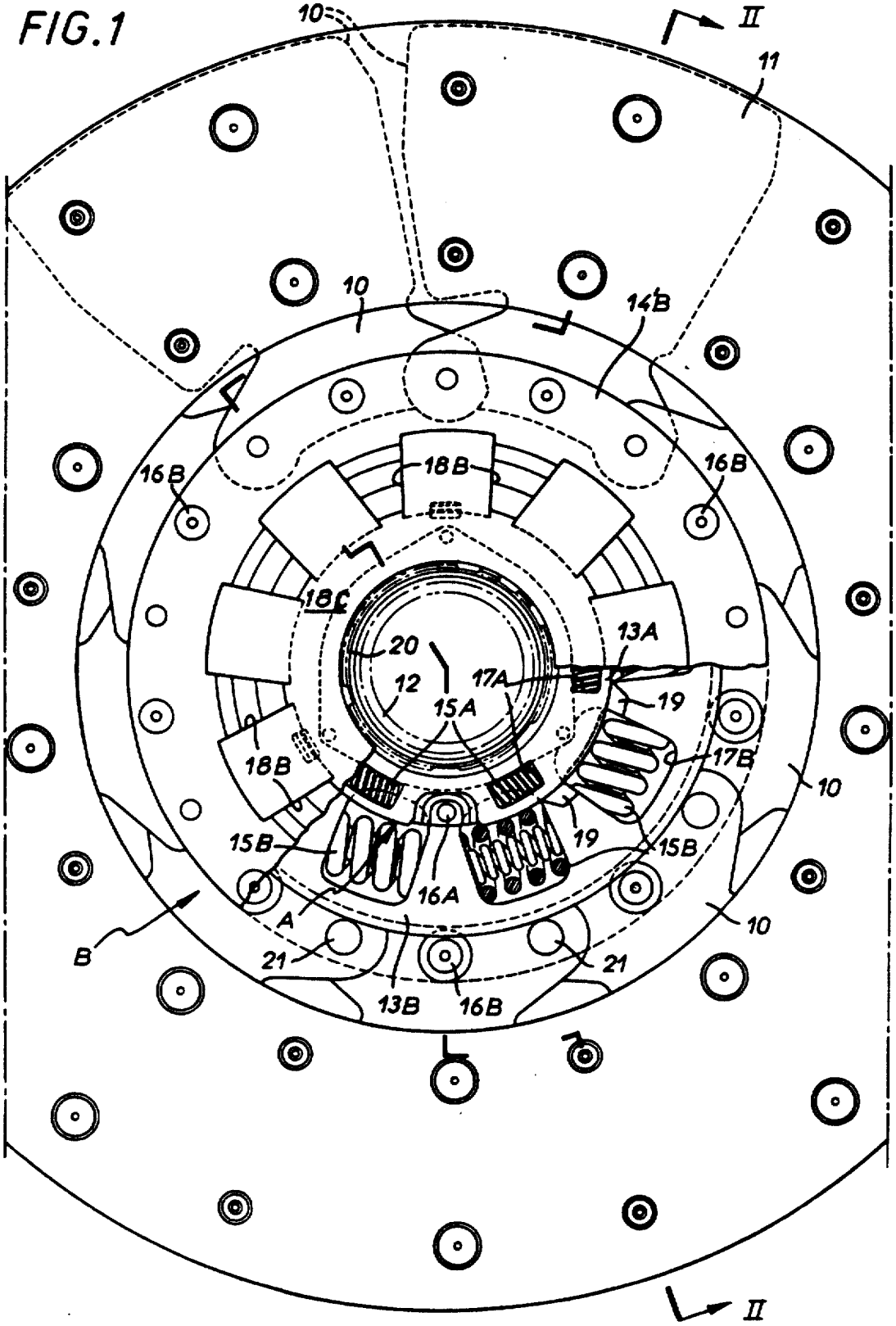
FIG. 1 is a partial elevational view, partly cutaway, of a clutch plate for a friction clutch embodying the present invention.

The first stage damping means A is operative between the hub 12 and the second stage damping means B. More particularly the flange 13A of the first stage damping means A is fixed to the hub 12 at least for rotation, and for axially movement and rotation as herein, for example, by crimping or press-fitting (FIG. 4), and the guide washers 14A are fastened to the second stage damping means B. To this end, one of the guide washers 14A comprises bifurcated portions 19 which are in engagement (here without play) with springs of the second stage damping means B substantially in register with corresponding windows 17B as illustrated in FIG. 1.

Figure 3:
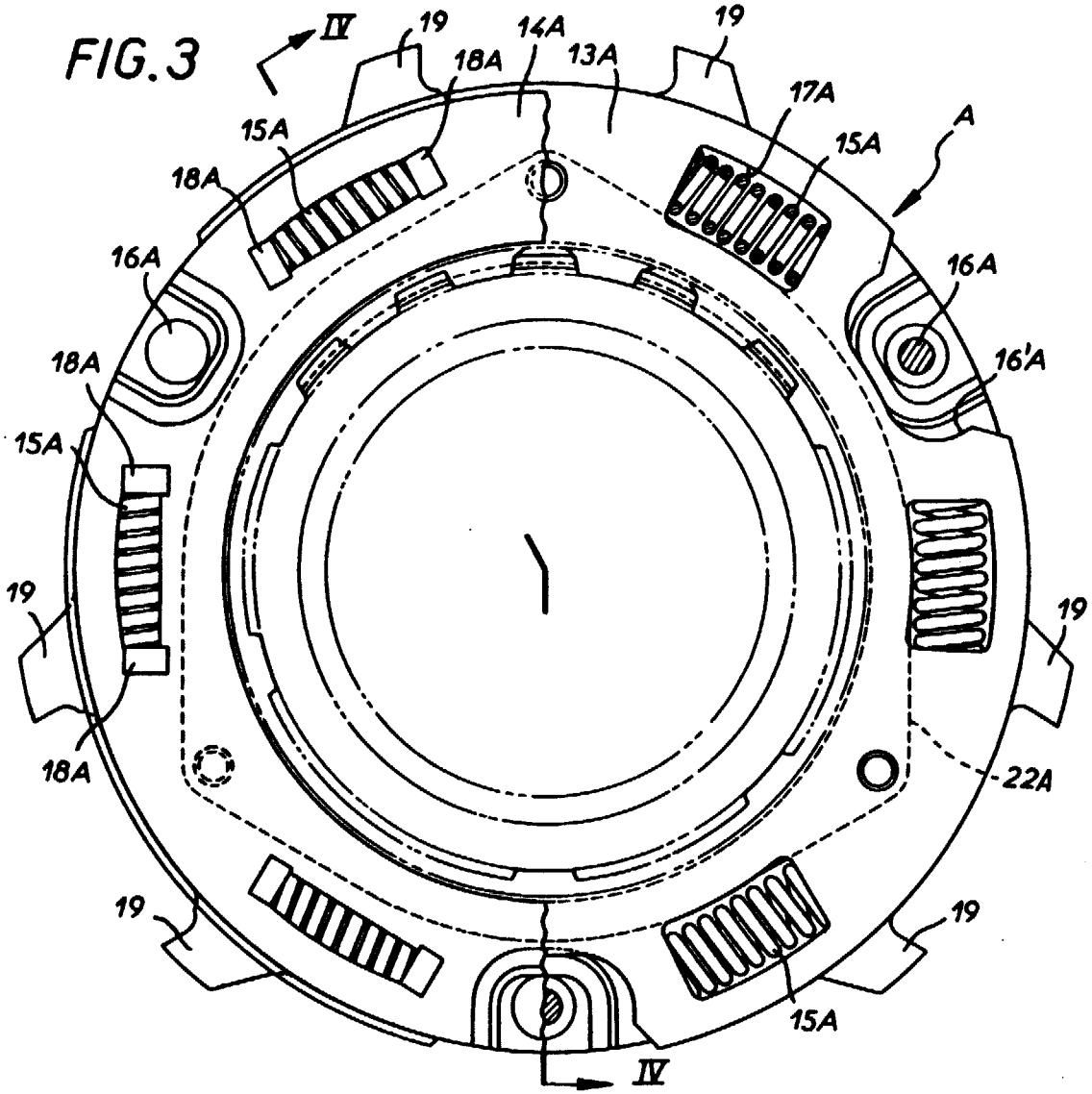
FIG. 3 is an enlarged elevational view, partly cutaway, of the first stage torsion damping means.

The second stage flange 13B is mounted along its inner periphery on hub 12 by means of splines 20 on hub 12 engaged with angular clearance with splines 20' on the axial part of the second stage L-shaped flange 13B. The friction disc 10 is fixed to one of the second stage guide washers 14B by means of rivets 21 (FIG. 3).

Figure 2:
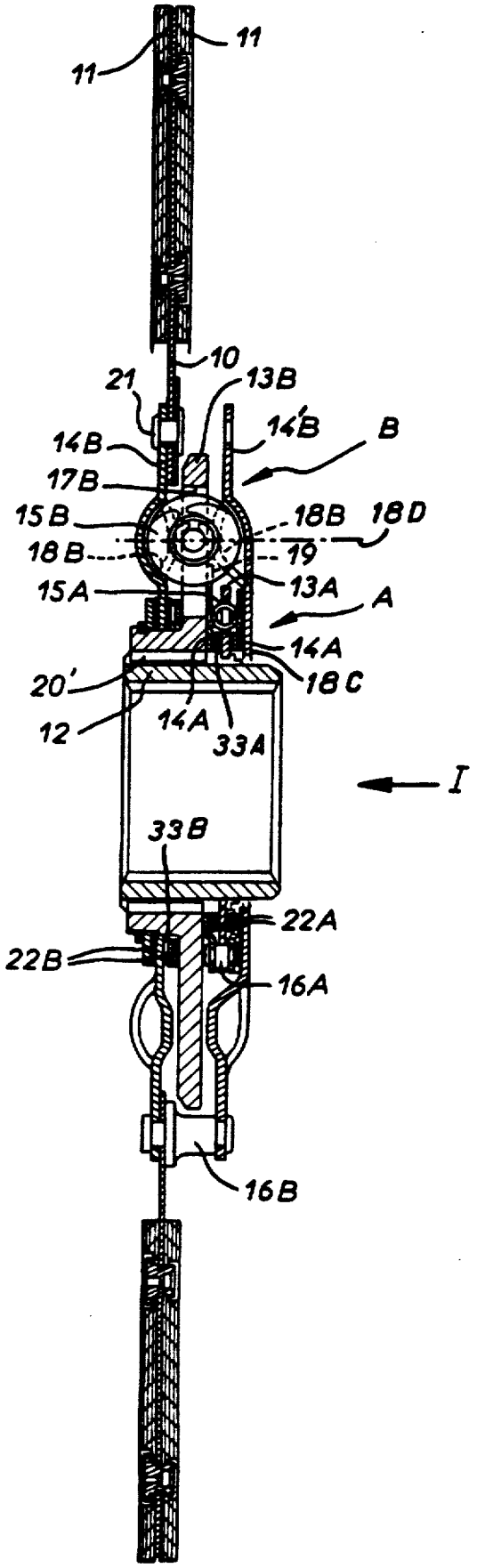
FIG. 2 is a cross-sectional view of the clutch plate taken along broken line II—II in FIG. 1.
Figure 4:
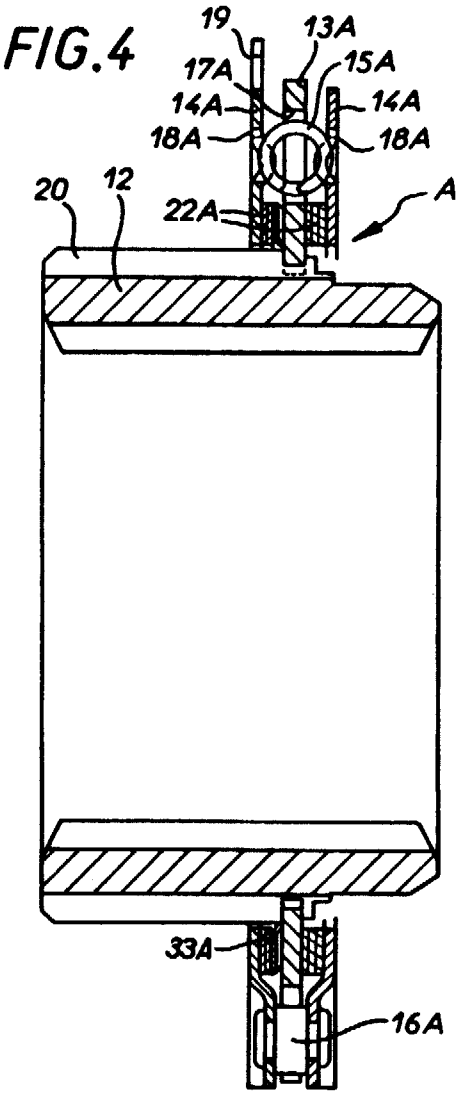
FIG. 4 is a cross-sectional view of the first stage torsion damping means taken along broken line IV—IV in FIG. 3.
Figure 6:
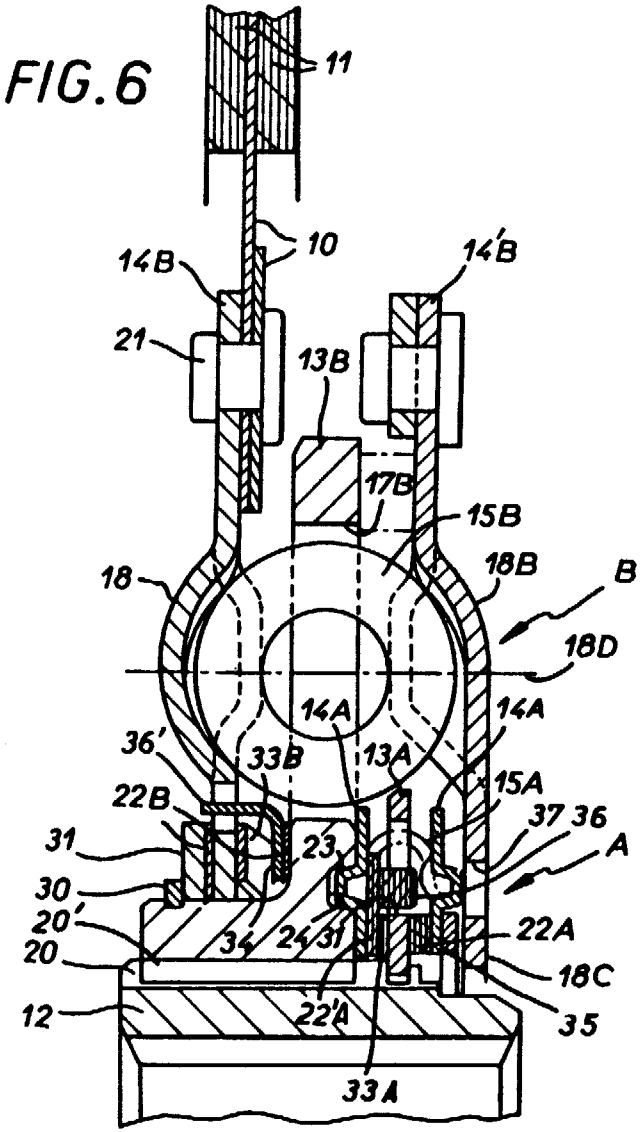
FIG. 6 is an enlarged partial sectional view of another embodiment according to the invention.

As better seen in FIG. 4 the first stage torsion damping means A comprises a pre-assembled unit or subassembly with hub 12. The unit is adapted to be mounted generally within the confines of the second stage torsion damping means B. To this end, as seen in FIG. 2, the first stage damping means A is accommodated between the flange 13B and one of the second stage guide washers 14'B thereby permitting very convenient assembly and also ensuring the second stage flange 13B is intact and has good mechanical strength. It will also be noted that the guide washer 14'B defines a protective shield for the first stage damping means A and it is different from the other second stage guide washer 14B while being axially compact within limits defined by the space between the stamped portions 18B. As seen in FIGS. 2 and 6, in guide washer 14'B, located adjacent the first stage torsion damping means A, to the right in the drawings, the axially outermost parts of the stamped portions 18B are extended radially inwardly by a plane portion 18C axially offset relative to the radially outer portion of the guide washer 14'B. The plane portion 18C extends from the circle at the radial distance of a dash-dot line 18D in FIG. 2 and generally from the middle of the guide washer 14'B.

Each of the first and second stage torsion damping means A, B is advantageously fitted with friction means together with biasing means interposed between its flanges 13A, 13B and its guide washers 14A, 14B, 14'B. The friction means 22A, 22B comprise small friction washers and the biasing means comprise crinkle washers 33A, 33B sold under the trade name Onduflex.

Assembling the clutch plate of the invention is extremely simple. The second stage damping means B is mounted on hub 12 and the friction disc 10 is mounted on the second stage torsion damping means B as if there was a single stage damping means with the sole exception that the flange 13B is mounted with angular clearance on the hub 12 and the pre-assembled unit defining the first stage damping means A is accommodated between flange 13B and one of the second stage guide washers 14'B as seen in FIG. 2.

When the torque transmitted by the clutch plate is very low or nil, the second stage damping means B is too stiff to come into operation and only the lower rated first stage damping means A absorbs vibrations thereby preventing idling or dead point noise. When the torque transmitted increases, in either direction, the flange 13A is adapted to be displaced angularly relative to the first stage guide washers 14A over a limited range of movement to absorb the angular clearance between the flange 13B and the hub 12. Thereupon the second stage damping means B becomes operative and functions in the usual manner to absorb vibrations in the course of normal operation within a predetermined angular range limited by means, here defined by the totally compressed condition of springs of second stage resilient means 15B.

It will be noted that during the second stage the springs of the first stage resilient means 15A are likewise in a fully compressed condition. Indeed, in practice, during the displacement of flange 13B relative to guide washers 14B, 14'B the springs of the resilient means 15B cooperable with bifurcated portions 19 are compressed whereas the bifurcated portions 19 retain their positions and keep the springs of resilient means 15A compressed.

The very simple and robust construction of the clutch plate and its convenient mode of assembly will be appreciated.

Figure 5:
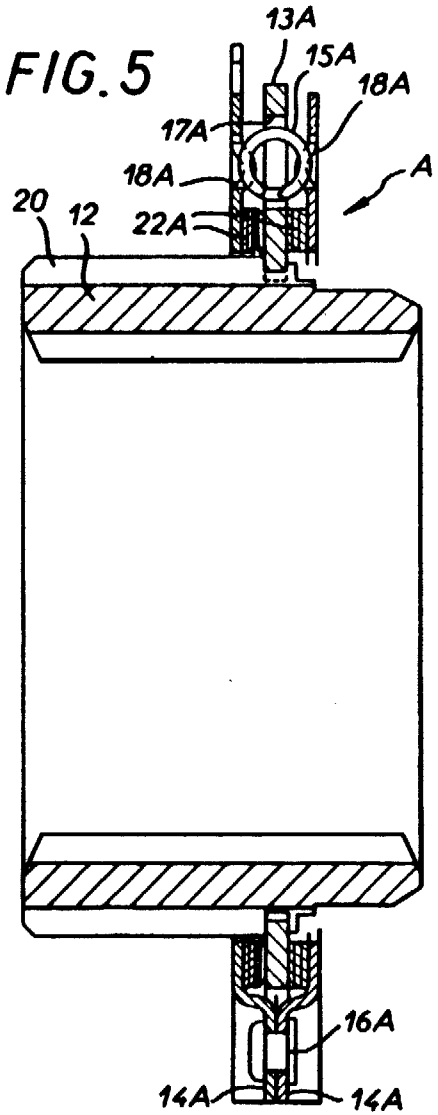
FIG. 5 is a view similar to that of FIG. 4 relative to an alternative embodiment.

Alternatively, as illustrated in FIG. 5, the construction may be generally as illustrated FIGS. 1–4 but the guide washers 14A are lie flush against each at the locations of the rivets 16A thereby facilitating the riveting operation.

In another embodiment (FIG. 6) the arrangement is similar to that described above with reference to FIGS. 1–4 wherein the bifurcated portions 19 for engagement with the springs of the resilient means 15B are eliminated and one of the first stage guide washers 14A comprises axial protrusions 23 which are in engagement in indentations 24 in the second stage flange 13B. For example, three such protrusions 23 may be provided, uniformly spaced 120° from one another. In the illustrated embodiment the axial protrusions 23 comprise stamped portions of the related first stage guide washer 14A, the other first stage guide washer 14A also having protrusions 23 so that both guide washers 14A are of identical configurations. The second stage guide washer 14'B is disposed axially outwardly of the other guide washer 13A and therefore axially outwardly of the entire first stage damping means A (and to the right as illustrated in FIG. 6). The second stage guide washer 14'B therefore has apertures 37 facing protrusions 23 to take into account wear of friction washers 22A, 22B.

Alternatively the protrusions 23 may comprise cylindrical studs of circular cross section suitable crimped, staked or welded to guide washer(s) of the first stage damping means A.

Thus, as will be noted the corresponding indentations 24 in the flange 13B are formed at the connecting zone between the legs of L-shaped section, that is at the radially inner end of the radial portion or leg of the L-shaped section joining the axial portion or leg which is the highest strength part of the flange, in practice in radial alignment with the windows 17B therein. Given the location, number and relatively small dimensions of the indentations 24 they therefore do not substantially diminish the mechanical strength of the second stage flange 13B.

As seen in FIG. 6, axially outwardly of the other second stage guide washer 14B, and therefore to the left of the guide washer 14B as illustrated, there is a retaining ring or clip 30 which is anchored in the axial portion of the L-shaped flange 13B followed by a backing washer 31 and a friction washer 22B. On the axially inner side of guide washer 14B between it and the transverse portion of the L-shaped flange section there is, in succession, a crinkle washer 33B, a backing washer 34 and a friction washer 22B.

The backing washer 31 is fixed for rotation with flange 13B whereas backing washer 34 is fixed for rotation with guide washer 14B. The backing washers may be so fixed by any suitable means, for example backing washer 34 may be fixed by means of axial lugs 36' as shown.

As will be noted the friction washer 22B located axially outwardly of the guide washer 14B and backing washer 31 associated therewith are entirely disposed within the overall space defined axially by the axially outermost portions of the stamped portions 18B of guide washer 14B and they therefore do not protrude axially outwardly of the entire clutch plate, thereby providing axial compactness of the clutch plate.

Referring again to the other side of the second stage flange 13B (to the right in FIG. 6) the first stage damping means is disposed entirely between the radial second stage flange 13B and the second stage guide washer 14'B. Between the radial flange 13A and the axially inner guide washer 14A is a crinkle washer 33A and a friction washer 22'A. Between the radial flange 13A and the other, axially outer guide washer 14A is a friction washer 22A and axially outwardly of the other guide washer 14A is a spacer washer 35 for preventing the protrusions 23 on the axially inner guide washer 14A from escaping from their indentations 24.

In practice, as illustrated the friction washer 22'A has discrete axially projecting teats 36, preferably three in number, for rotationally securing the friction washer 22'A to flange 13A, received in the apertures 38 in the flange 13A.

The last mentioned modifications of the FIG. 6 embodiment are applicable to the foregoing embodiments too; the unnumbered teats of the friction washers 22A in particular as visible in FIGS. 1 and 3.

It will be understood that in all of the embodiments the L-shaped section of the second stage flange 13B contributes to the accommodation of the first stage damping means A between one of the second stage guide washers 14'B and the second stage flange 13B. Indeed, this L-shaped section leaves the space between the guide washer 14'B and the flange 13B entirely free for accommodating the first stage damping means 13A.

Furthermore, the L-shaped section of the flange 13B permits the location of the springs of the first stage resilient means 15A as close as possible to the axis of the clutch plate which is particularly advantageous, given the low rating of these springs which are correspondingly sheltered from the effects of centrifugal force to which they are particularly sensitive.

Of course, the invention is not intended to be limited to the illustrated and described embodiments but on the contrary encompasses various modifications and alternatives within the purview of the appended claims. For example, although the L-shaped section of the second stage flange is particularly advantageous, the present invention admits of second stage flanges of different configurations.

What is claimed is:

1. A clutch plate for a friction clutch, said clutch plate comprising a friction disc having friction facings bn opposite sides thereof and a hub, said friction disc and said hub being mounted for relative angular displacement within a predetermined range, first and second stage torsion damping means coupling said hub and friction disc together, the first stage damping means being lower rated than the second stage damping means, each of said first and second stage damping means comprising a radial flange, two guide washers fixed to each other and disposed on axially opposite sides of the associated flange, resilient means circumferentially interposed between each of said flanges and its associated guide washers, said first stage damping means being operative between said hub and said second stage damping means, said friction disc being fixed to one of said second stage guide washers, means fastening said first stage guide washers to said second stage damping means, said first stage damping means comprising a unit pre-assembled with said hub and being disposed within the confines of said second stage damping means.

2. A clutch plate according to claim 1, wherein said first stage damping means is accommodated between said second damping means flange and one of said guide washers of said second stage damping means.

3. A clutch plate according to claim 2, wherein said means fastening said first stage guide washers to said second stage damping means comprises bifurcated portions formed on one of said first stage guide washers in engagement with said second stage resilient means.

4. A clutch plate according to claim 1, wherein said means fastening said first stage guide washers to said second stage damping means comprises protrusions on one of said first stage guide washers in engagement with indentations in said second stage flange.

5. A clutch plate according to claim 4, wherein said second stage flange has an L-shaped cross section, said indentations in said second state damping means being established at the radially inner end of a radial leg of said second stage flange.

6. A clutch plate according to claim 2, wherein said means fastening said first stage guide washers to said second stage damping means comprises protrusions on one of said first stage guide washers in engagement with indentations in the second stage flange, said one second stage guide washer having apertures facing said protrusions on said one first stage guide washers.

7. A clutch plate according to claim 1, wherein rivets fix said first stage guide washers together, portions of said first stage guide washers at the locations of said rivets being axially spaced apart.

8. A clutch plate according to claim 1, wherein rivets fix said first stage guide washers together portions of said first stage guide washers at the locations of said rivets being in contact with one another.

9. A clutch plate according to claim 1, wherein each of said first and second damping means comprises friction means axially interposed between its flange and its guide washers.

10. The clutch plate according to claim 9, wherein each of said friction means comprises at least one friction washer coupled for rotation with its associated flange.

11. The clutch plate according to claim 9, wherein said friction means for said second stage damping means comprises a friction washer disposed axially outside the space delimited by said second stage guide washers.

12. A clutch plate according to claim 1, wherein said one second stage guide washer has stamped portions for accommodating corresponding ones of said second stage resilient means, said axially outermost parts of said stamped portion of said one guide washer being connected to a radially inwardly extending planar portion at the middle of said one second stage guide washer.

*13. A clutch plate for a friction clutch, said clutch plate comprising a friction disc having friction facings on opposite sides thereof and a hub, said friction disc and said hub being mounted for relative angular displacement within a predetermined range, first and second stage torsion damping means coupling said hub and said friction disc together, the first stage damping means being lower rated than the second stage damping means, each of said first and second stage damping means comprising a radial flange, two guide washers fixed to each other and disposed on axially opposite sides of the associated flange, resilient means circumferentially interposed between each of said flanges and its associated guide washers, said first stage damping means being operative between said hub and said second stage damping means, said friction disc being fixed to one of said second stage guide washers, means fastening said first stage guide washers to said second stage damping means, said first stage damping means being disposed within the confines of said second stage damping means, said first stage damping means being accommodated axially between said radial flange of said second stage damping means and one of said guide washers of said second stage damping means and radially between said hub and said second stage damping means.*

* * * * *